(12) United States Patent
Gurusamy et al.

(10) Patent No.: US 9,086,280 B2
(45) Date of Patent: Jul. 21, 2015

(54) AIRCRAFT DISPLAY SYSTEMS AND METHODS WITH FLIGHT PLAN DEVIATION SYMBOLOGY

(75) Inventors: Saravanakumar Gurusamy, Tamil Nadu (IN); Vishnu Vardhan Reddy Annapureddy, Karnataka (IN); Santhosh Gautham, Karnataka (IN); Dhivagar Palanisamy, Tamil Nadu (IN); Haricharan Reddy, Karnataka (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 645 days.

(21) Appl. No.: 13/227,191

(22) Filed: Sep. 7, 2011

(65) Prior Publication Data

US 2013/0060466 A1   Mar. 7, 2013

(51) Int. Cl.
*G01C 21/00* (2006.01)
*G01C 23/00* (2006.01)

(52) U.S. Cl.
CPC .................................. *G01C 23/005* (2013.01)

(58) Field of Classification Search
USPC ........... 701/3–5, 8, 9, 14, 465, 466, 467, 411; 340/971–979
See application file for complete search history.

(56) References Cited

U.S. PATENT DOCUMENTS

| | | | |
|---|---|---|---|
| 5,051,910 A | 9/1991 | Liden | |
| 5,121,325 A | 6/1992 | DeJonge | |
| 5,369,589 A | 11/1994 | Steiner | |
| 6,085,129 A | 7/2000 | Schardt et al. | |
| 6,441,751 B2 * | 8/2002 | Berlioz et al. | 340/977 |
| 6,690,299 B1 | 2/2004 | Suiter | |
| 6,885,313 B2 | 4/2005 | Selk, II et al. | |
| 6,933,859 B2 * | 8/2005 | Hurt et al. | 340/945 |
| 6,970,784 B2 | 11/2005 | Shinagawa | |
| 7,508,322 B1 | 3/2009 | Krenz et al. | |

(Continued)

FOREIGN PATENT DOCUMENTS

EP   1273987 A3   5/2005
WO   2008145590 A3   4/2008

OTHER PUBLICATIONS

EP Examination Report for Application 12183027.7, dated Jun. 20, 2014.

(Continued)

*Primary Examiner* — Khoi Tran
*Assistant Examiner* — Adam Mott
(74) *Attorney, Agent, or Firm* — Ingrassia Fisher & Lorenz, P.C.

(57) ABSTRACT

An aircraft system includes a deviation module and a visual display. The deviation module is configured to receive a flight plan with a flight segment to a waypoint, the flight plan including a lateral profile, a vertical profile, and a time profile, the time profile including a predetermined time of arrival associated with the waypoint, receive a current lateral position and a current altitude, estimate an estimated time of arrival associated with the waypoint, compare the current lateral position to the lateral profile to generate lateral deviation, compare the current altitude to the vertical profile to generate vertical deviation, and compare the predetermined time of arrival to the estimated time of arrival to generate time deviation. The visual display is coupled to the deviation module and configured to display deviation symbology representing the lateral deviation, the vertical deviation, and the time deviation.

16 Claims, 10 Drawing Sheets

(56) References Cited

U.S. PATENT DOCUMENTS

| | | | |
|---|---|---|---|
| 7,765,061 B1* | 7/2010 | Barber et al. | 701/467 |
| 2002/0173881 A1 | 11/2002 | Lash et al. | |
| 2003/0093219 A1 | 5/2003 | Schultz et al. | |
| 2003/0132860 A1* | 7/2003 | Feyereisen et al. | 340/973 |
| 2003/0139876 A1 | 7/2003 | Shinagawa | |
| 2004/0181318 A1* | 9/2004 | Redmond et al. | 701/9 |
| 2004/0189492 A1 | 9/2004 | Selk, II et al. | |
| 2009/0132107 A1* | 5/2009 | DeJonge | 701/15 |
| 2009/0259392 A1 | 10/2009 | Berard et al. | |
| 2010/0030467 A1* | 2/2010 | Wise et al. | 701/204 |
| 2010/0097241 A1* | 4/2010 | Suddreth | 340/972 |
| 2010/0114406 A1* | 5/2010 | DeJonge et al. | 701/3 |
| 2010/0131124 A1 | 5/2010 | Klooster | |
| 2013/0253738 A1* | 9/2013 | Fucke | 701/14 |

OTHER PUBLICATIONS

EP Search Report for Application 12183027.7, dated Jun. 2, 2014.

\* cited by examiner

AIRCRAFT DISPLAY SYSTEMS AND METHODS WITH FLIGHT PLAN DEVIATION SYMBOLOGY

TECHNICAL FIELD

The present invention generally relates to aircraft systems and methods, and more particularly relates to aircraft systems and methods that display symbology representing location, altitude, and time characteristics.

BACKGROUND

During aircraft operation, it is important to provide accurate and timely information to the pilot that facilitates effective flight management. The primary flight display is typically provided to display information generated by the flight management system about course, speed, altitude, rate of climb and the like. In particular, the primary flight display may display navigation information, such as a visual depiction of the trajectory according to the flight plan with respect to latitude, longitude, and altitude. Conventional systems may also display some deviation symbology that provides an indication about the current state of the aircraft relative to the anticipated state of the aircraft specified by the flight plan.

More recent and future generations of aircraft systems are implementing flight plans that additionally incorporate a time constraint or consideration, e.g., a flight plan that requires the aircraft to arrive reliably at a predetermined location (e.g., waypoint) at a predetermined time. Although some conventional systems provide information about lateral and vertical deviation from the flight plan, conventional systems typically do not generate or display time deviation of the current state of the aircraft relative to the flight plan.

Accordingly, it is desirable to provide improved aircraft systems for displaying flight information, particularly information related to lateral, vertical, and time deviation with respect to a flight plan and the current state of the aircraft. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an aircraft system includes a deviation module and a visual display. The deviation module is configured to receive a flight plan with a flight segment to a waypoint, the flight plan including a lateral profile, a vertical profile, and a time profile, the time profile including a predetermined time of arrival associated with the waypoint, receive a current lateral position and a current altitude, estimate an estimated time of arrival associated with the waypoint, compare the current lateral position to the lateral profile to generate lateral deviation, compare the current altitude to the vertical profile to generate vertical deviation, and compare the predetermined time of arrival to the estimated time of arrival to generate time deviation. The visual display is coupled to the deviation module and configured to display deviation symbology representing the lateral deviation, the vertical deviation, and the time deviation.

In accordance with another exemplary embodiment, a method is provided for displaying deviation symbology. The method includes receiving a flight plan with a flight segment to a waypoint, the flight plan including a lateral profile, a vertical profile, and a time profile, the time profile including a predetermined time of arrival associated with the waypoint; receiving a current lateral position and a current altitude; estimating an estimated time of arrival associated with the waypoint, comparing the current lateral position to the lateral profile to generate lateral deviation; comparing the current altitude to the vertical profile to generate vertical deviation; comparing the predetermined time of arrival to the estimated time of arrival to generate time deviation; and displaying fused deviation symbology representing the lateral deviation, the vertical deviation, and the time deviation.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein provide aircraft systems and methods that display improved deviation information about the current state of the aircraft relative to the flight plan. The deviation information may include symbology displayed to the pilot to provide information with respect to lateral position deviation, altitude deviation, and time deviation. For example, lateral deviation and altitude deviation may be displayed by one or more indicators positioned relative to a horizontal axis and a vertical axis, respectively. Time deviation may be displayed with a reference circle superimposed on the horizontal axis and the vertical axis and a concentric or coincident indicator circle that changes size relative to the reference circle to indicate time deviation during operation. The fused symbology provides an intuitive and compact display of deviation in four dimensions.

Figure 1:
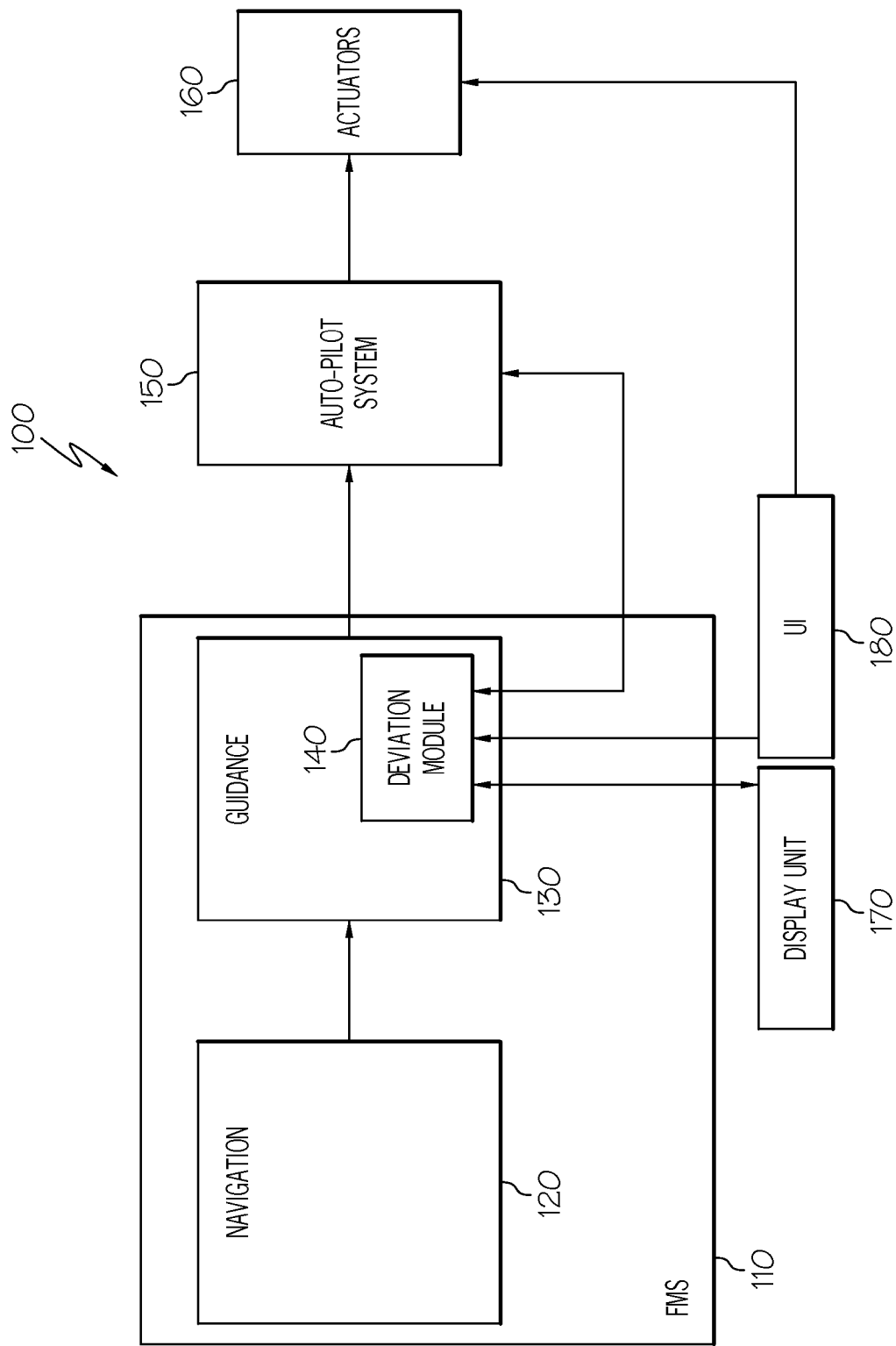
FIG. 1 is a block diagram of an aircraft system in accordance with an exemplary embodiment.

FIG. 1 is a block diagram of an aircraft system 100 in accordance with an exemplary embodiment. In the illustrated embodiment, the aircraft system 100 includes a flight management system (FMS) 110, an auto-pilot system 150, aircraft actuators 160, a display unit 170, and a user interface 180. As described in greater detail below, the FMS 110 includes a navigation system 120 and a guidance system 130 with a deviation module 140.

Notably, it should be understood that although system 100 appears in FIG. 1 to be arranged as an integrated system, the exemplary embodiments are not so limited and can also include an arrangement whereby one or more of the components are separate components or subcomponents of another system located either onboard or external to an aircraft. Furthermore, the system 100 is not limited to manned aircraft and can also be implemented for other types of vehicles, such as, for example, spacecraft or unmanned vehicles. The components of the system 100 are introduced below prior to a more detailed description of the deviation module 140.

The FMS 110 generally performs a wide variety of in-flight tasks during operation of the aircraft, including navigation and guidance of the aircraft respectfully implemented by the navigation system 120 and the guidance system 130. Although not specifically shown, the FMS 110, including the navigation system 120 and guidance system 130, may be implemented with one or more computer processors, such as for example, a microprocessor or digital signal processor capable of performing the functions discussed herein. The FMS 110 may further include a database with any element necessary for the operation of the aircraft and creation of a flight plan, including data associated with waypoints, airports, terrain information and applicable flight rules.

In general, the navigation system 120 determines the current kinematic state of the aircraft. As such, in the exemplary embodiment, the navigation system 120 includes any suitable position and direction determination devices, such as an inertial reference system (IRS), an air-data heading reference system (AHRS), radio navigation aids, or a global navigation satellite system (GNSS). For example, the navigation system 120 provides at least the current position and velocity of the aircraft to the guidance system 130. Other navigation information may include the current heading, current course, current track, altitude, pitch, and any desired flight information.

The guidance system 130 receives the navigation information from the navigation system 120 and inputs from the pilot or other sources, and in turn, generates a flight plan to an intended destination and/or evaluates the navigation information with respect to a current flight plan. The guidance system 130 includes any suitable algorithms or decision modules sufficient to construct, implement, and/or evaluate a flight plan.

The guidance system 130 may consider control of the aircraft in four dimensions: lateral location (e.g., latitude and longitude), altitude, and time. As such, the guidance system 130 constructs or evaluates a flight plan that may include lateral profiles, vertical profiles, and time profiles for various segments that make up the flight plan. As an example, the flight plan may be formed by segments between waypoints that are traversed at predetermined times. Although the terms lateral profile, vertical profile, and time profile are used to distinguish the dimensions of control, in practice, the various profiles may be integrated with one another.

The time profile of the flight plan may include the time at which the aircraft is scheduled to arrive and, in some instances, may be referred to as a required time of arrival or a time constraint. In one scenario, such profiles may be dictated by Air Traffic Control (ATC) or the Federal Aviation Administration (FAA) rules. In other instances, the time profiles may be based on fuel economy, airspace scheduling, or selected by the pilot. Further details about the guidance system 130, including a more detailed description of the deviation module 140, is provided below. Briefly, the deviation module 140 compares the current state of the aircraft to the anticipated state of the aircraft according to the flight plan, generates display commands representing any deviation therefrom as deviation symbology, and provides the deviation symbology to the display unit 170 for display to the pilot.

Based on the flight plan, the guidance system 130 provides commands to the auto-pilot system 150 for implementation. The commands generated by the guidance system 130 associated with the flight plan may include a pitch command, a pitch rate command, a roll command, speed brake guidance, and a throttle guidance that function to implement the profiles of the flight plan. In response, the auto-pilot system 150 generates actuator commands that function to control the flight characteristics of the aircraft via the actuators 160. As examples, the actuator commands generated by the auto-pilot system 150 include elevator commands, aileron commands, rudder commands, speed brake commands, and throttle commands. In some exemplary embodiments, an auto-throttle system that provides throttle commands to the actuators 160 may be provided separate from the auto-pilot system 150.

The actuators 160 collectively include one or more aircraft components that, when controllably positioned, guide the movement of the aircraft, including the flight surfaces and associated drive components. As described above, the position of the actuators 160 are controlled by the commands of the auto-pilot system 150 or by commands from the pilot via the user interface 180. The number and type of actuators 160 included in an aircraft may vary. As examples, the actuators 160 may include elevators for adjusting the pitch of the aircraft, ailerons for adjusting the roll of the aircraft, and a rudder for adjusting the yaw of the aircraft respectively controlled according to the elevator commands, aileron commands, and rudder commands from the auto-pilot system 150 or from the pilot. The actuators 160 further include a throttle that adjusts the speed of the aircraft by respectively increasing or decreasing power to the engine according to the throttle commands from the auto-pilot system 150 or the pilot.

The system 100 additionally includes the display unit 170. The display unit 170 may include any suitable device or apparatus capable of displaying various types of computer generated symbols and information in an integrated monochrome or multi-color form. As such, the display unit 170 may include a graphics display generator and/or receive graphics display commands from the guidance system 130. Most notably, the display unit 170 is any mechanism capable of displaying the deviation symbology described below.

Suitable examples of the display unit 170 may include various CRT or flat panel display systems, such as LCDs, OLED displays, projection displays, plasma displays, HDDs, HUDs, and the like. The display unit 170 may be a dedicated display unit for the deviation symbology generated by the deviation module 140 or part of a multifunctional display unit, such as a navigation display (e.g., NAV or INAV), primary flight display (e.g., PFD or IPFD), or mode control unit. Further examples of the display unit 170 are described below.

The pilot or flight crew may initiate and modify the flight plan or flight commands of the guidance system 130 via the user interface 180. For example, the pilot may manually input a target speed, speed command, or destination at the user interface 180. The user interface 180 may include any suitable hardware and software components that enable the pilot to interface with the system 100. Such components may include keyboards, mouse devices, buttons, switches, levers, and knobs.

Now that the components of the aircraft system 100 have been generally described, the deviation module 140 will be described in greater detail. As described above, the deviation module 140 generally determines the difference between the current state of the aircraft and the anticipated or predicted state of the aircraft according to the flight plan and provides this information to the pilot. Since the flight plan includes lateral, vertical, and time profiles, the deviation may include any combination of lateral, altitude, or time deviation.

As such, the deviation module 140 receives the current latitude, longitude, and altitude of the aircraft provided by the navigation system 120 and compares these values to the appropriate latitude, longitude, and altitude of the aircraft according to the flight plan generated by the guidance system 130. The deviation module 140 further calculates an estimated time of arrival for a subsequent waypoint or destination and compares the estimated time of arrival to the anticipated or required time of arrival for the waypoint or destination. The estimated time of arrival may be based on, for example, the current and anticipated speed of the aircraft, weather conditions, fuel load, mechanical performance or capabilities, speed limits, and others parameters that may impact the time of arrival. The time deviation is the difference between the estimated time of arrival and the required time of arrival.

For example, in one exemplary embodiment, the estimated time of arrival may be calculated for a current leg by dividing the distance to the waypoint from a current position by the current speed, and the estimated time of arrival may be calculated for a subsequent flight leg by dividing the distance between waypoints by the estimated speed for that flight leg. Other techniques may be provided.

The lateral, altitude, and time deviation provide an indication to the pilot or operator about whether or not the aircraft is operating according to the flight plan and, if not, how much the aircraft is deviating from the flight plan. The deviation may also provide the pilot or operator information about how to return to operation according to the profiles in the flight plan. For example, based on the deviation information, the pilot may adjust the movement (e.g., speed, lateral position, or altitude) of the aircraft to achieve the desired arrival time, position, or altitude. If the aircraft is incapable of reaching the predetermined location at the predetermined time, the pilot may modify the flight plan or inform flight control about the deviation. In particular, the deviation module 140 may generate symbology representing the lateral, altitude, and time deviations suitable for display to the pilot on the display unit 170 and may be implemented in a variety of different configurations, as discussed in greater detail below with reference to FIGS. 2-11.

Figure 2:
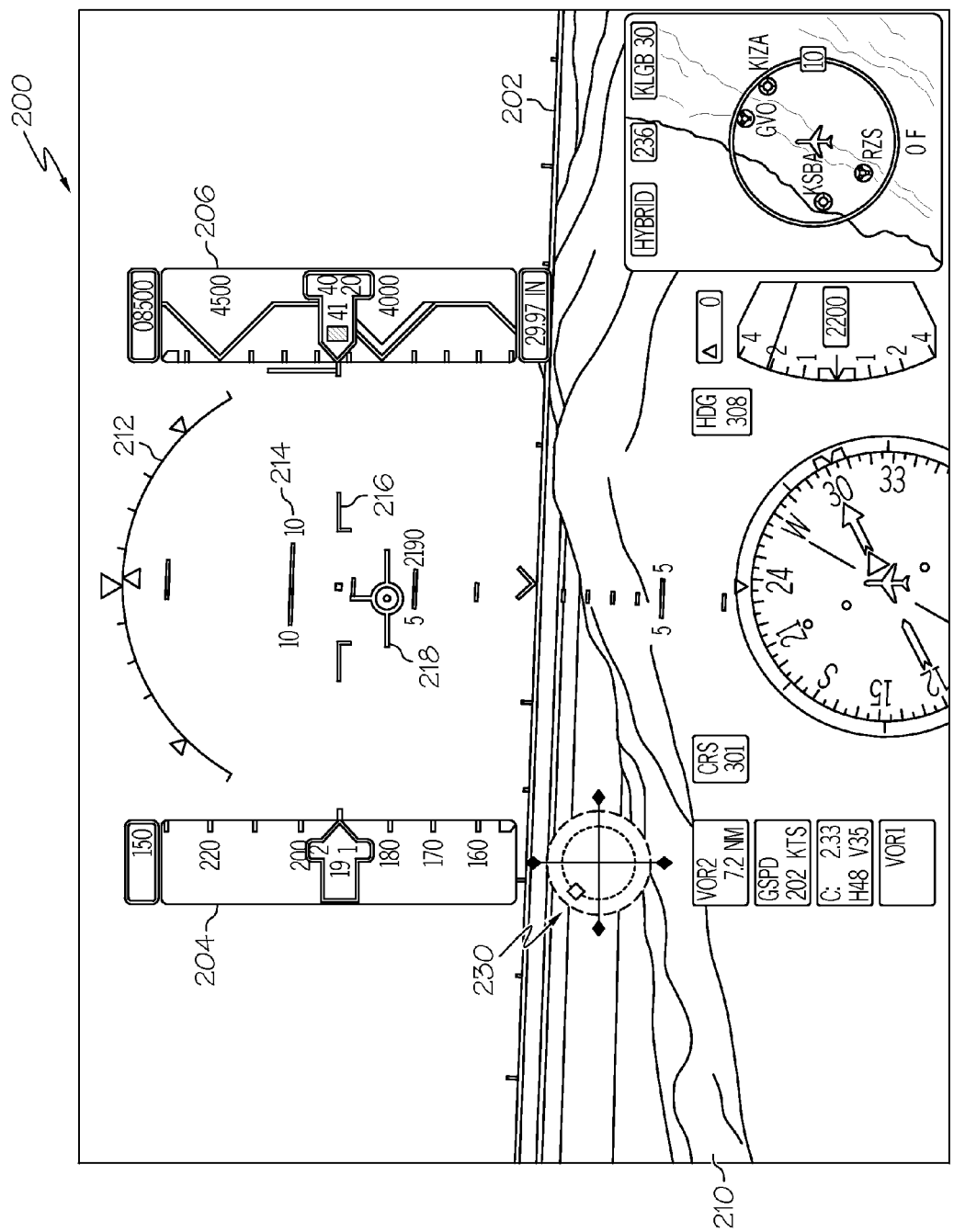
FIG. 2 is a visual display for a primary flight display generated by the aircraft system of FIG. 1 in accordance with a first exemplary embodiment.

FIG. 2 is a visual display 200 generated by the aircraft system 100 of FIG. 1 in accordance with a first exemplary embodiment. The visual display 200 may be produced, for example, on the display unit 170 (FIG. 1) discussed above, and in this embodiment, may correspond to a primary flight display.

The visual display 200 shows, among other things, computer generated symbols (e.g., generated by the guidance system 130) representing a zero pitch reference line 202, an airspeed scale or tape 204, and an altitude scale or tape 206. Although the visual display 200 is shown as an egocentric, first-person frame of reference, the visual display 200 can be a secondary, wingman, and/or plan or perspective view that enables a viewer to view the aircraft, as well as zoom in and out. Although the visual display 200 is generally associated with a primary flight display, the display can also be utilized on a multi-function display, head up display, and/or a head mounted display.

In this embodiment, the visual display 200 further includes terrain (e.g., identified generally as element 210). Terrain 210 is rendered as a three-dimensional, perspective view, and can include any representation of the environment surrounding the aircraft, including flattened terrain. In one embodiment, terrain 210 includes natural and man-made obstacles, including building and navigational positions, such as waypoint symbology (not shown). Other symbology depicted in FIG. 2 includes a roll scale 212, a pitch scale 214, an aircraft reference 216, and a flight path vector 218.

The visual display 200 further includes deviation symbology 230, which as introduced above, provides information about the current state of the aircraft relative to the predicted state according to the flight plan. In this embodiment, the deviation symbology 230 is stand-alone symbology sized so as not to obscure other information on the visual display 200 in a primary field of view while providing the desired information.

Figure 3A:
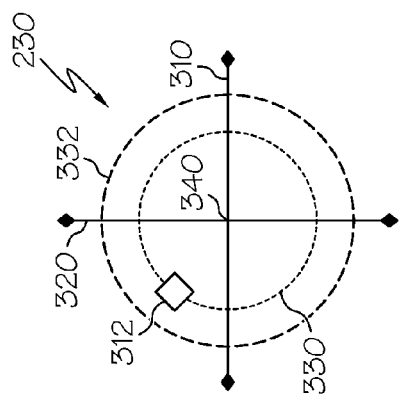
FIGS. 3A-3C are examples of deviation symbology suitable for the visual display of FIG. 2 in accordance with an exemplary embodiment.
Figure 3B:
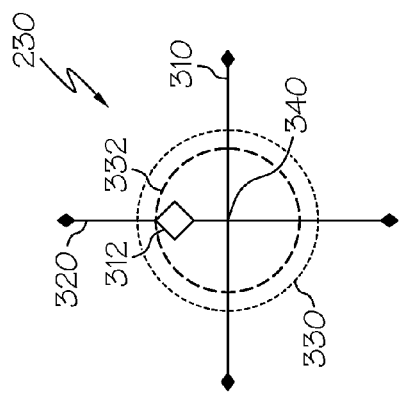
Figure 3C:
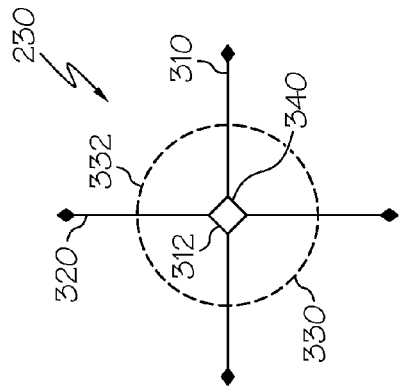

Additional details about the deviation symbology 230 are described with reference to FIGS. 3A-3C. FIGS. 3A-3C are close-up views of the deviation symbology 230 in various scenarios.

Referring initially to FIG. 3A, the deviation symbology 230 is formed by a horizontal axis 310, a vertical axis 320, a reference circle 330, a first indicator 312, and a second indicator 332 (or indicator circle). In general, the first indicator 312 is respectively positioned relative to the horizontal axis 310 and the vertical axis 320 to provide information about the lateral and altitude deviation. Particularly, the intersection of horizontal axis 310 and the vertical axis 320 provides a reference point 340 as a zero-deviation reference for lateral and altitude deviation information, and the first indicator 312 is adjusted along the stationary horizontal axis 310 and the stationary vertical axis 320 as the deviation changes. As such, the relative position of the first indicator 312 is a graphical, spatial representation of the performance of the aircraft relative to the lateral and altitude profiles of the flight plan. As an example, in the scenario of FIG. 3A, the first indicator 312 is to the left of the reference point 340 along the horizontal axis 310, thus indicating that the aircraft is off-path to the right and that the aircraft should be directed to the left to return to the flight plan. The first indicator 312 is above the reference point 340 along the vertical axis 320, thus indicating that the aircraft is off-path below the vertical path and that the aircraft should be directed upward to increase elevation.

In general, the position of the first indicator 312 relative to the axis 310 or 320 indicates the extent of deviation, e.g., the further the first indicator 312 is from the reference point 340, the greater the deviation. In one exemplary embodiment, the extent of the horizontal and vertical deviation is limited within the view of the symbology 230. For example, the ends of the axes 310 and 320 may represent ±10° and anything above ±10° is generally indicated by positioning the indicator 312 at the respective end of the axes 310 and 320. In further embodiments, the axes 310 and 320 may have a scale or graduations to indicate a reference for the quantity of deviation. For example, if the length of each portion of the axis 310 or 320 relative to the reference point 340 represents ±10°, each portion of axis 310 or 320 may have five scale markers, each representing 2° of deviation. In some embodiments, the scale and/or sensitivity of the time deviation and time deviation symbology 230 may depend on the phase of flight. For example, the sensitivity may be increased during an approach phase.

The reference circle 330 and second indicator 332 are superimposed on the axes 310 and 320 and depict time deviation. The reference circle 330 represents the time according to the flight plan, such as a required time of arrival at a given point, and the second indicator 332 represents the current state of the aircraft, e.g., the estimated time of arrival of the aircraft based on the current position, speed, or other parameters. As such, the second indictor 332 changes in size relative to the generally stationary reference circle 330 to provide information about the time deviation. For example, the time deviation, expressed in time, may be scaled as a diameter of the second indicator 332 relative to the reference circle 330.

In one exemplary embodiment, the radius of the second indicator 332 may be represented by the following Equation (1):

$$R\_SecondIndicator = R\_Ref * \frac{T2}{T1} \quad (1)$$

Where R_SecondIndicator=the unit length of the radius of the second indicator;
R_Ref=the unit length of the radius of the reference circle;
T1=estimated time of arrival; and
T2=required time of arrival In FIG. 3A, the second indicator 332 is larger than the reference circle 330, thus indicating that the aircraft is behind schedule according to the time profile of the flight plan. As above, the difference between the second indicator 332 and reference circle 330 indicates the relative deviation, which may be limited to a maximum value.

In general, the first and second indicators 312 and 332 may be independent to show all dimensions of deviation. Accordingly, the first and second indicators 312 and 332 are dynamically variable to indicate the deviation as operating conditions and navigation circumstances change. The symbology 230 may be considered "fused symbology" since all deviation is presented on a single portion of the display 200.

The deviation symbology 230 in FIG. 3A is identical to the deviation symbology 230 in FIGS. 3B and 3C, albeit in different deviation scenarios. In FIG. 3B, the first indicator 312 is positioned relative to the horizontal axis 310 at the reference point 340 (e.g., on the vertical axis 320), thus indicating that the aircraft is on the predetermined lateral path of the flight plan, e.g., that the aircraft has no lateral deviation. The first indicator 312 is above the reference point 340 along the vertical axis 320, thus indicating that the aircraft is off-path below the predetermined vertical path and that the aircraft should be directed upward to increase elevation. In FIG. 3B, the second indicator 332 is smaller than the reference circle 330, thus indicating that the aircraft is ahead of schedule according to the time profile of the flight plan. In FIG. 3C, the first indicator 332 is on the reference point 340 and the second indicator 332 is coincident to the reference circle 330, thus indicating that there is no deviation of the current state of the aircraft relative to the lateral, altitude, and time requirements of the flight plan. Although deviation symbology 230 uses a horizontal axis and vertical axis arrangement with a superimposed circle, other arrangements of conveying similar information may be provided, including different shapes or graphical presentations of the axes 310 and 320, circle 330, and indicators 312 and 332.

The visual display 200 (FIG. 2) may be in color and the color of the deviation symbology 230 may be selected to provide a visual indication of the amount of deviation. As an exemplary color scheme, the original color of the symbology 230 may be white, and a change in color may occur to enhance situational awareness when the deviation exceeds a predetermined amount. Other mechanisms for increasing visibility may include flashing symbols, audible alarms, or a combination thereof.

Figure 4A:
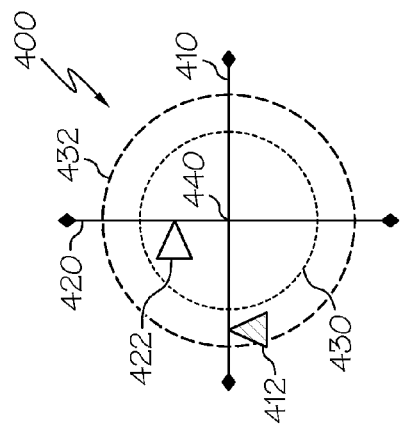
FIGS. 4A-4C are further examples of deviation symbology suitable for the visual display of FIG. 1 in accordance with an exemplary embodiment.
Figure 4B:
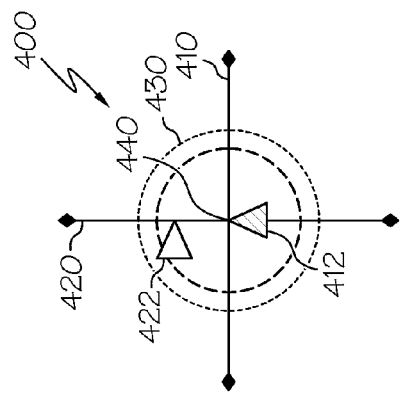
Figure 4C:
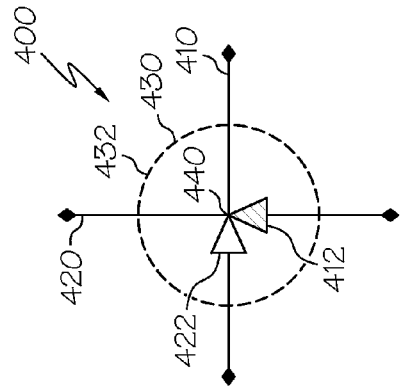

FIGS. 4A-4C are further examples of deviation symbology 400 that may be displayed on a display unit 170 (FIG. 1), including the visual display 200 of FIG. 2. FIGS. 4A-4C are generally similar to the deviation symbology 230 of FIGS. 3A-3C except that the first indicator 312 of FIGS. 3A-3C has been replaced by separate lateral and vertical indicators 412 and 422. The lateral indicator 412 is positioned on a horizontal axis 410 to indicate the lateral deviation, and the vertical indicator 422 is positioned on a vertical axis 420 to indicate the vertical deviation. A time indicator 432 and reference circle 430 function similar to the second indicator 332 and reference circle 330 of FIGS. 3A-3C described above.

As such, in the scenario of FIG. 4A, the lateral indicator 412 is to the left of the reference point 440 along the horizontal axis 410, thus indicating that the aircraft is off-path to the right and that the aircraft should be directed to the left to return to the flight plan. The horizontal indicator 422 is above the reference point 440 along the vertical axis 420, thus indicating that the aircraft is off-path below the vertical path and that the aircraft should be directed upward to increase elevation. The time indicator 432 is larger than the reference circle 430, thus indicating that the aircraft is behind schedule according to the time profile of the flight plan.

In the scenario of FIG. 4B, the lateral indicator 412 is positioned relative to the horizontal axis 410 at the reference point 440, thus indicating that the aircraft is on the lateral path of the flight plan, e.g., that the aircraft has no lateral deviation. The vertical indicator 412 is above the reference point 440, thus indicating that the aircraft is off-path below the vertical path and that the aircraft should be directed upward to increase elevation. The time indicator 432 is smaller than the reference circle 430, thus indicating that the aircraft is ahead of schedule according to the time profile of the flight plan. In the scenario of FIG. 4C, the lateral indicator 412 and vertical indicator 422 are each on the reference point 440 and the timing indicator 432 is coincident to the reference circle 430, thus indicating that there is no deviation of the current state of the aircraft relative to the lateral, altitude, and time requirements of the flight plan.

Figure 5:
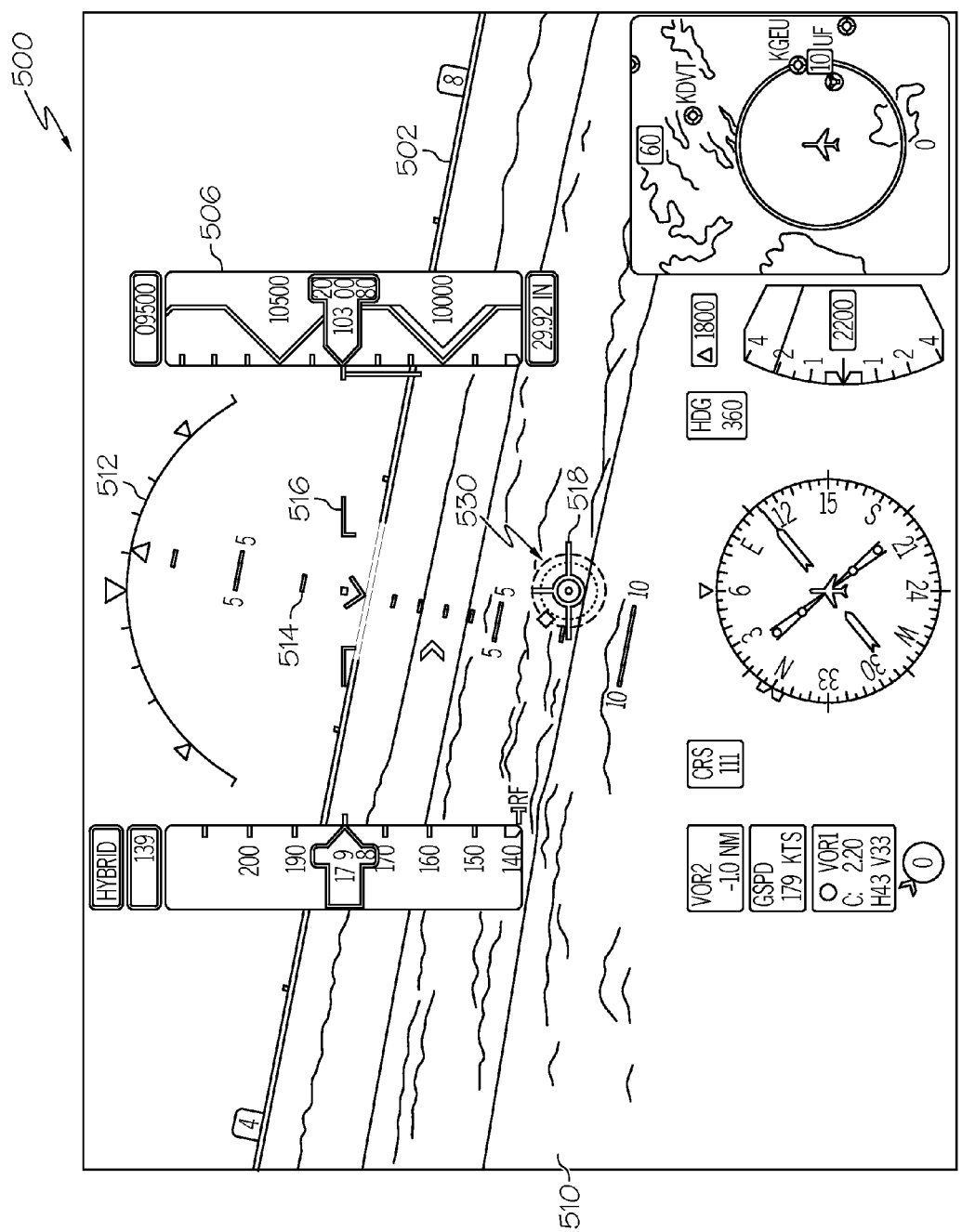
FIG. 5 is a visual display for a primary flight display generated by the aircraft system of FIG. 2 in accordance with a second exemplary embodiment.

FIG. 5 is a visual display 500 generated by the aircraft system 100 of FIG. 1 in accordance with another exemplary embodiment. The visual display 500 may be produced, for example, on the display unit 170 (FIG. 1) discussed above, and in this embodiment, may correspond to a primary flight display.

The visual display 500 of FIG. 5 is generally similar to the visual display 200 of FIG. 2 and shows, among other things, computer generated symbols representing a zero pitch reference line 502, an airspeed scale or tape 504, an altitude scale or tape 506, and terrain 510. Other symbology depicted in FIG. 5 includes a roll scale 512, a pitch scale 514, an aircraft reference 516, and a flight path vector 518. Typically, the flight path vector 518 is a symbol that is positioned relative to the terrain 510 to indicate the current flight path of the aircraft. While the deviation symbology 230 of the visual display 200 of FIG. 2 is a stand-alone, separate portion of the display 200, the visual display 500 includes deviation symbology 530 incorporated into or fused with the flight path vector 518, as is shown in more detail in FIGS. 6A-6C. In this embodiment, the deviation symbology 530 may be two-dimensional or conformal to the underlying three-dimensional terrain 510.

Figure 6A:
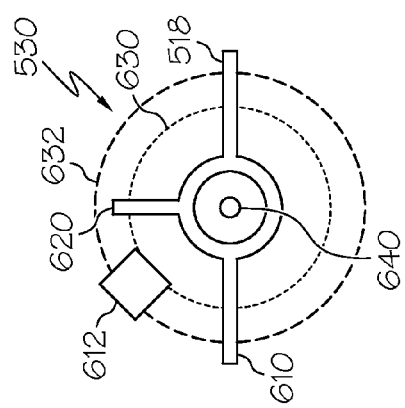
FIGS. 6A-6C are examples of deviation symbology suitable for the visual display of FIG. 5 in accordance with an exemplary embodiment.
Figure 6B:
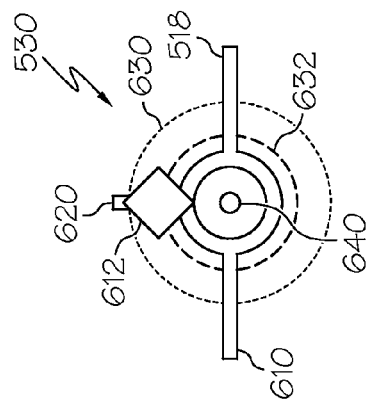
Figure 6C:
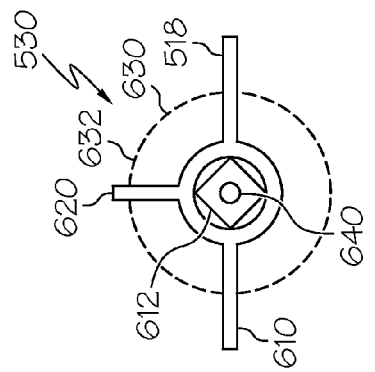

FIGS. 6A-6C are close-up views of the deviation symbology 530 incorporated into the flight path vector 518 in various scenarios. Referring initially to FIG. 6A, the deviation symbology 530 is superimposed on the flight path vector 518 such that the cross bars of the flight path vector 518 form a horizontal axis 610 and a vertical axis 620. A first indicator 612 is respectively positioned relative to the horizontal axis 610 and the vertical axis 620 to provide information about the lateral and altitude deviation. The center of the flight path vector 518, which is also the intersection of horizontal axis 610 and the vertical axis 620, provides a reference point 640 as a zero-deviation reference for lateral and altitude deviation information. The first indicator 612 is adjusted along the horizontal axis 610 and vertical axis 620 as the deviation changes. As an example, in the scenario of FIG. 6A, the first indicator 612 is to the left of the reference point 640 along the horizontal axis 610, thus indicating that the aircraft is off-path to the right and that the aircraft should be directed to the left to return to the flight plan. The first indicator 612 is above the reference point 640 along the vertical axis 620, thus indicating that the aircraft is off-path below the vertical path and that the aircraft should be directed upward to increase elevation.

The deviation symbology 530 further includes a reference circle 630 and a second indictor 632. The second indictor 632 changes in size relative to the reference circle 630 to provide information about the time deviation. In other words, the reference circle 630 represents the time according to the flight plan, such as a required time of arrival at a given point, and the second indicator 632 represents the estimated time of arrival based on the current state of the aircraft. In FIG. 6A, the second indicator 632 is larger than the reference circle 630, thus indicating that the aircraft is behind schedule according to the time profile of the flight plan.

The deviation symbology 630 in FIG. 6A is identical to the deviation symbology 630 in FIGS. 6B and 6C, albeit in different deviation scenarios. In FIG. 6B, the first indicator 612 is positioned relative to the horizontal axis 610 at the reference point 640 (e.g., on the vertical axis 620), thus indicating that the aircraft is on the lateral path of the flight plan, e.g., that the aircraft has no lateral deviation. The first indicator 612 is above the reference point 640 along the vertical axis 620, thus indicating that the aircraft is off-path below the vertical path and that the aircraft should be directed upward to increase elevation. In FIG. 6B, the second indicator 632 is smaller than the reference circle 630, thus indicating that the aircraft is ahead of schedule according to the time profile of the flight plan. In FIG. 6C, the first indicator 632 is on the reference point 640 and the second indicator 632 is coincident to the reference circle 630, thus indicating that there is no deviation of the current state of the aircraft relative to the lateral, altitude, and time requirements of the flight plan.

Figure 7:
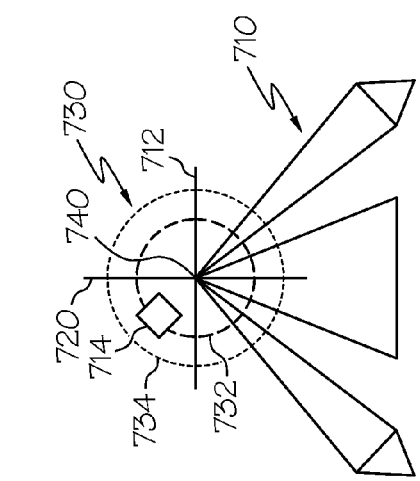
FIG. 7 is a partial visual display for a primary flight display generated by the aircraft system of FIG. 1 in accordance with a third exemplary embodiment.

FIG. 7 is a partial visual display 700 for a primary flight display generated by the aircraft system 100 of FIG. 1 in accordance with a third exemplary embodiment. The partial visual display 700 includes flight director symbology 710 and may, for example, be incorporated into larger visual displays, such as the visual displays 200 and 500 of FIGS. 2 and 5. Generally, the flight director symbology 710 corresponds to pitch and roll guidance commands generated by the navigation system 120 (FIG. 1) according to the flight plan. As such, an operator may attempt to position the flight path vector (e.g., flight path vector 218 and 518) on the flight director symbology 710 to achieve the desired path. As shown in the partial visual display 700 of FIG. 7, deviation symbology 730 may also be incorporated into the flight director symbology 710.

Similar to the deviation symbology 230 and 530 (FIGS. 2 and 5) discussed above, the deviation symbology 730 of FIG. 7 includes a horizontal axis 712 and a vertical axis 720. A first indicator 714 is respectively positioned relative to the horizontal axis 712 and the vertical axis 720 to provide information about the lateral and altitude deviation. A reference point 740 is shown as a zero-deviation reference for lateral and altitude deviation information. The first indicator 714 is adjusted along the horizontal axis 712 and vertical axis 720 as the deviation changes. As an example, in the scenario of FIG. 7, the first indicator 714 is to the left of the reference point 740 along the horizontal axis 710, thus indicating that the aircraft is off-path to the right and that the aircraft should be directed to the left to return to the flight plan. The first indicator 714 is above the reference point 740 along the vertical axis 720, thus indicating that the aircraft is off-path below the vertical path and that the aircraft should be directed upward to increase elevation.

The deviation symbology 730 further includes a reference circle 732 and a second indictor 734. The second indictor 734 changes in size relative to the reference circle 732 to provide information about the time deviation. In other words, the reference circle 732 represents the time according to the flight plan, such as a required time of arrival at a given point, and the second indicator 734 represents the estimated time of arrival based on the current state of the aircraft. In FIG. 7, the second indicator 734 is larger than the reference circle 732, thus indicating that the aircraft is behind schedule according to the time profile of the flight plan.

Figure 8:
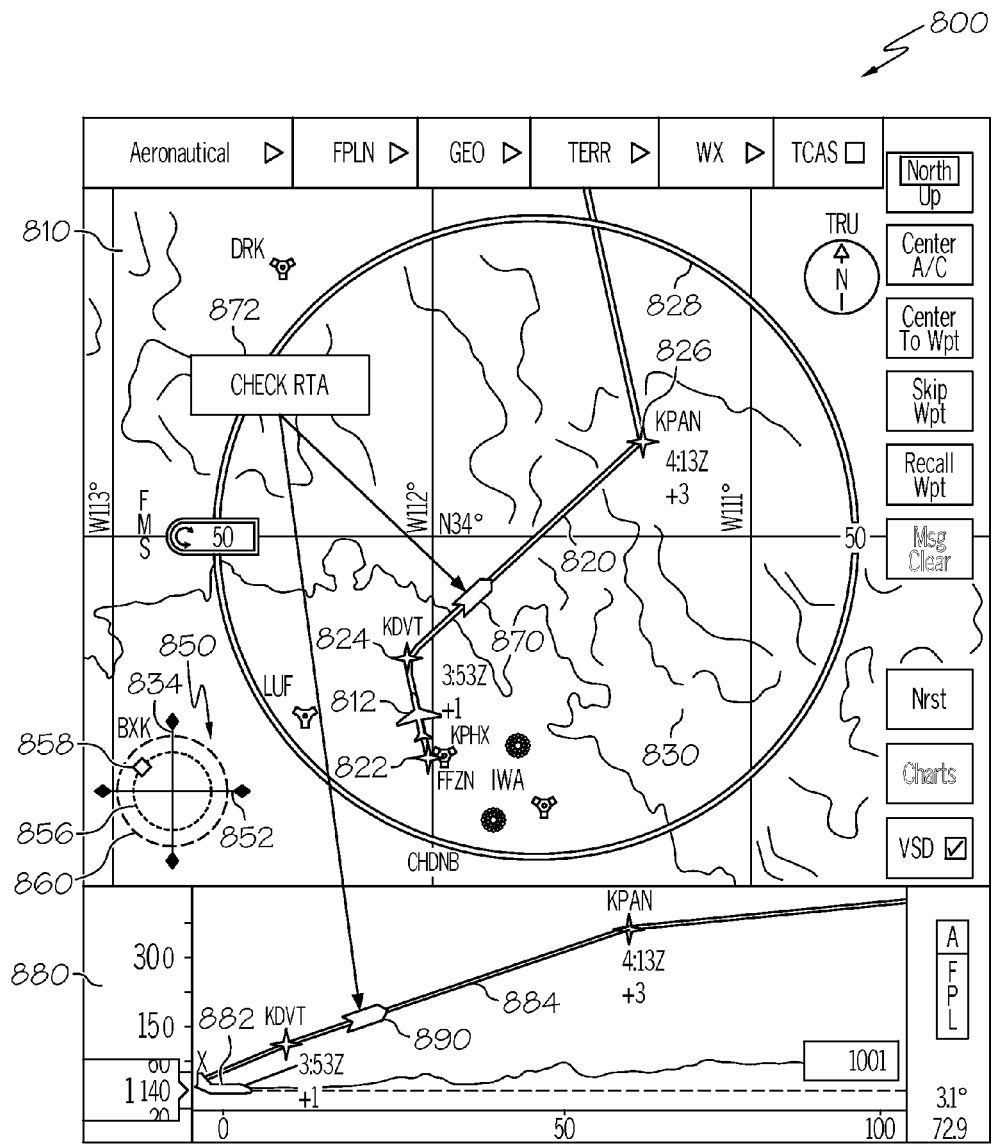
FIG. 8 is a visual display for a navigation display generated by the aircraft system of FIG. 1 in accordance with an exemplary embodiment.

FIG. 8 is a visual display 800 for a navigation display generated by the aircraft system 100 of FIG. 1 in accordance with an exemplary embodiment. The visual display 800 includes at least a plan view 810 and an elevation view 880 displayed in different areas. Although FIG. 8 shows the plan view 810 and elevation view 880 displayed simultaneously, the views 810 and 880 may also be displayed individually. In general, the plan view 810 and elevation view 880 are multicolor, although one or both may be monochromatic or black and white.

The plan view 810, generally known as a lateral map display, is a computer generated top-view of the aircraft, represented as an aircraft symbol 812, and the surrounding environment based on information provided by the flight management system 110 and other system components of FIG. 1. Generally, the pilot may zoom in and out of the plan view 810 to depict the desired display elements. Additionally, the pilot may select elements to be displayed. In the view of FIG. 8, the plan view 810 includes symbology representing the flight path 820 of the aircraft. Other types of symbology may include waypoint symbols 822, 824, and 826, range rings 828, terrain information 830, and other navigation information. As described above, the waypoints 822, 824, and 826 make up the segments or legs of the flight plan. For example, the flight plan may specify that the aircraft must arrive at a current waypoint (e.g., waypoint 824) and subsequent waypoints (e.g. waypoint 826) at particular times according to the lateral, vertical, and time profiles. As shown in FIG. 8, the plan view 810 is centered on the flight path 820, which may or may not be aligned with the aircraft, although other embodiments may have alternate configurations.

In addition, and as will now be described in more detail, the plan view 810 of the visual display 800 may also selectively render deviation symbology 850. In this embodiment, the deviation symbology 850 is stand-alone symbology positioned within a corner or periphery of the plan view 810, although as discussed below, other configurations may be provided.

Similar to the deviation symbology 230, 530, and 730 (FIGS. 2, 5, and 7) discussed above, the deviation symbology 850 of FIG. 8 includes a horizontal axis 852, a vertical axis 854, and reference circle 856. A first indicator 858 is respectively positioned relative to the horizontal axis 852 and the vertical axis 854 to provide information about the lateral and altitude deviation. A second indictor 860 changes in size relative to the reference circle 856 to provide information about the time deviation. In FIG. 8, the second indictor 860 is larger than the reference circle 856, thus indicating that the aircraft is behind schedule on the time flight plan.

In addition to or in lieu of the deviation symbology 830, the plan view 810 may include other indications related to time deviation. For example, a time bug 870 may be positioned on the flight plan leg relative to the aircraft symbol 812 to indicate if the aircraft will arrive at the next waypoint at the appropriate time. In general, the time bug 870 is a triangular symbol that moves along the flight path to represent the currently estimated arrival time relative to the predetermined arrival time according to the flight plan. If the time bug 870 is ahead of the aircraft symbol 812, the current state of the aircraft is relatively late, such as in FIG. 8, and if the time bug 870 is behind the aircraft symbol 812, the current state of the aircraft is relatively early. In this exemplary embodiment, the time bug 870 may also be referred to as a "lateral bug" since the bug 870 indicates the scheduled lateral position of the aircraft relative to the current position.

As also shown in FIG. 8, a text-based message 872 may be displayed to the pilot to provide further information about any flight plan deviation. For example, in FIG. 8, the message "CHECK RTA" is displayed to the pilot to indicate that the current state aircraft is relatively late with respect to the flight plan. In some cases, the visual display 800 may only provide the message 872 in situations when the time requirements are at risk or in situations to prompt the pilot to look more closely at the other deviation symbology 850. Other messages such as "LATE" or "EARLY" may be generated.

As introduced above, the visual display 800 further includes an elevation view 880, which may also be a vertical situation display. The elevation view 880 provides a two-dimensional view of the flight environment. For example, the elevation view 880 includes an aircraft symbol 882 and a visual depiction of the vertical profile 884 of the flight plan, including aircraft position, path angle, flight path waypoints, and other vertical navigation information. In particular, a time bug 890 is also displayed on the elevation view 880 to provide a visual indication of the time deviation between the current state of the aircraft and the flight plan. In the depicted scenario, the time bug 890 is ahead of the aircraft symbol 882, thus indicating that the aircraft is behind schedule relative to the flight plan.

Figure 9:
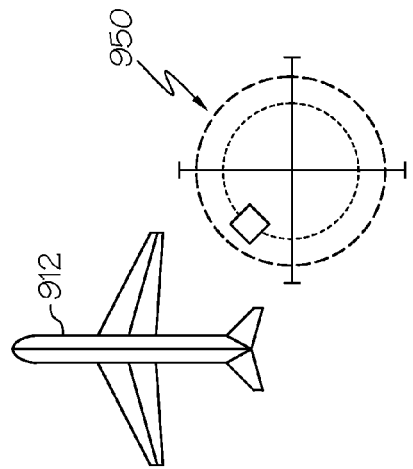
FIG. 9 is an example of deviation symbology suitable for the visual display of FIG. 8 in accordance with an exemplary embodiment.

FIG. 9 is another example of deviation symbology 950 that may be incorporated into the visual display 800 of FIG. 8. Although the deviation symbology 850 of FIG. 8 is stand-alone symbology on the periphery of the plan view 810, the deviation symbology 950 of FIG. 9 may be placed adjacent to an aircraft symbol 912 (e.g., adjacent to the aircraft symbol 812 of FIG. 9).

Figure 10:
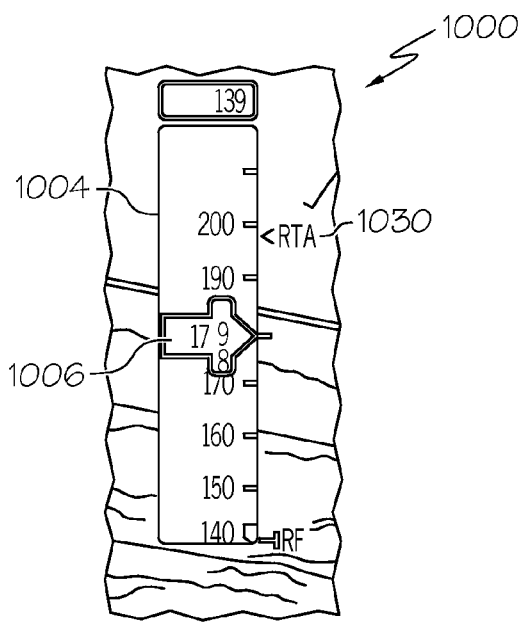
FIG. 10 is a partial view of a visual display for a primary flight display generated by the aircraft system of FIG. 1 in accordance with an exemplary embodiment.

In general, time deviation may be expressed in any suitable manner. For example, FIG. 10 is a partial view of a visual display 1000 generated by the aircraft system 100 of FIG. 1 on the display unit 170 in accordance with an exemplary embodiment. In particular, the partial view of FIG. 10 illustrates an airspeed tape 1004 similar to the airspeed tape 204 incorporated into the visual display 200 of FIG. 2 discussed above. Generally, the airspeed tape 1004 is a movable scale representing airspeed values and a pointer 1006 indicates the current speed on the tape 1004.

In this embodiment, a time bug 1030 is positioned relative to the airspeed tape 1004 to indicate a speed at which the time requirements for a subsequent waypoint will be achieved. In the depicted scenario, the time bug 1030 is greater than the current speed, thereby indicating that the current state of the aircraft is behind the time profile. The time bug 1030 of FIG. 10 further indicates that, if the pilot desires to meet the time profile requirement of the waypoint, the speed may be adjusted to the speed at the time bug 1030, e.g., to speed up the aircraft.

Figure 11:
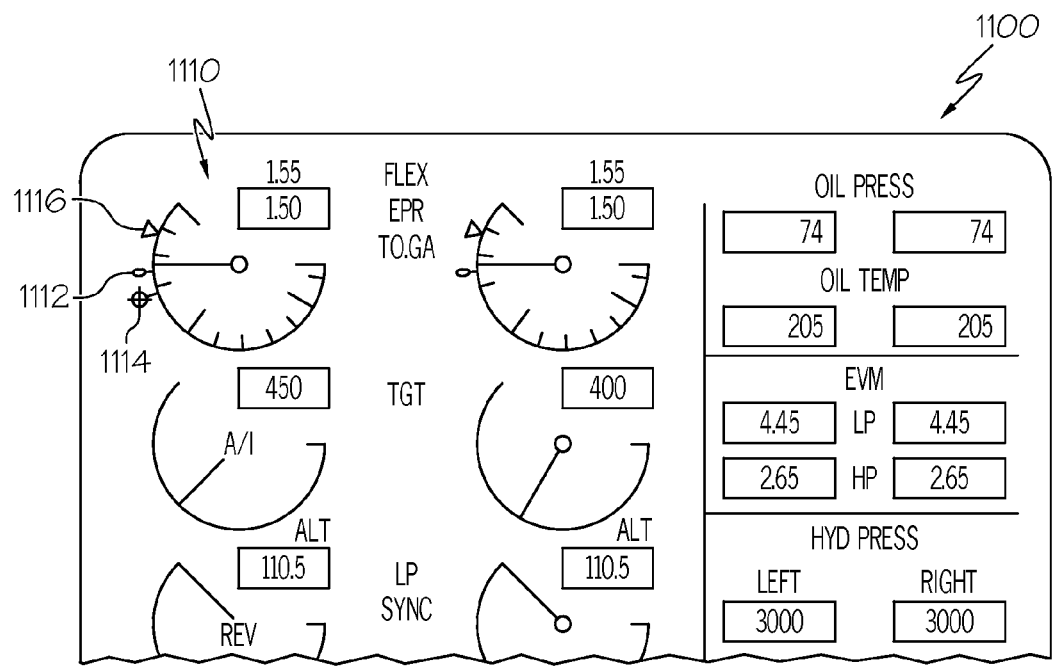
FIG. 11 is a partial view of a visual display generated by the aircraft system of FIG. 1 in accordance with an exemplary embodiment.

As another example, FIG. 11 is a view of a visual display 1110 generated by the aircraft system 100 of FIG. 1 on the display unit 170, particularly an Engine Indicating and Crew Alerting System (EICAS) display that provides the pilot with instrumentation displays for aircraft engines and other systems. As an example, the EICAS display 1100 includes a thrust dial 1110 that displays engine thrust in terms of engine pressure ratio (EPR). The thrust dial 1110 particularly displays the current EPR command 1112, an EPR time bug 1114, and an EPR target bug 1116. The EPR time bug 1114 is behind the current EPR command 1112, thus indicating that the current state of the aircraft is behind the time requirements of the flight plan. The position of the EPR target bug 1116 indicates the thrust level required to meet the time requirements and may be calculated by the deviation module 140 based on information from the auto-pilot system 150, which as noted above, may include an auto-throttle system. In other embodiments, the EPR target bug 1116 may be based on information from a stand-alone auto-throttle system. If desired, the pilot may attempt to adjust the current EPR command 1112 to match the EPR target bug 1116 to achieve the time requirements.

Figure 12:
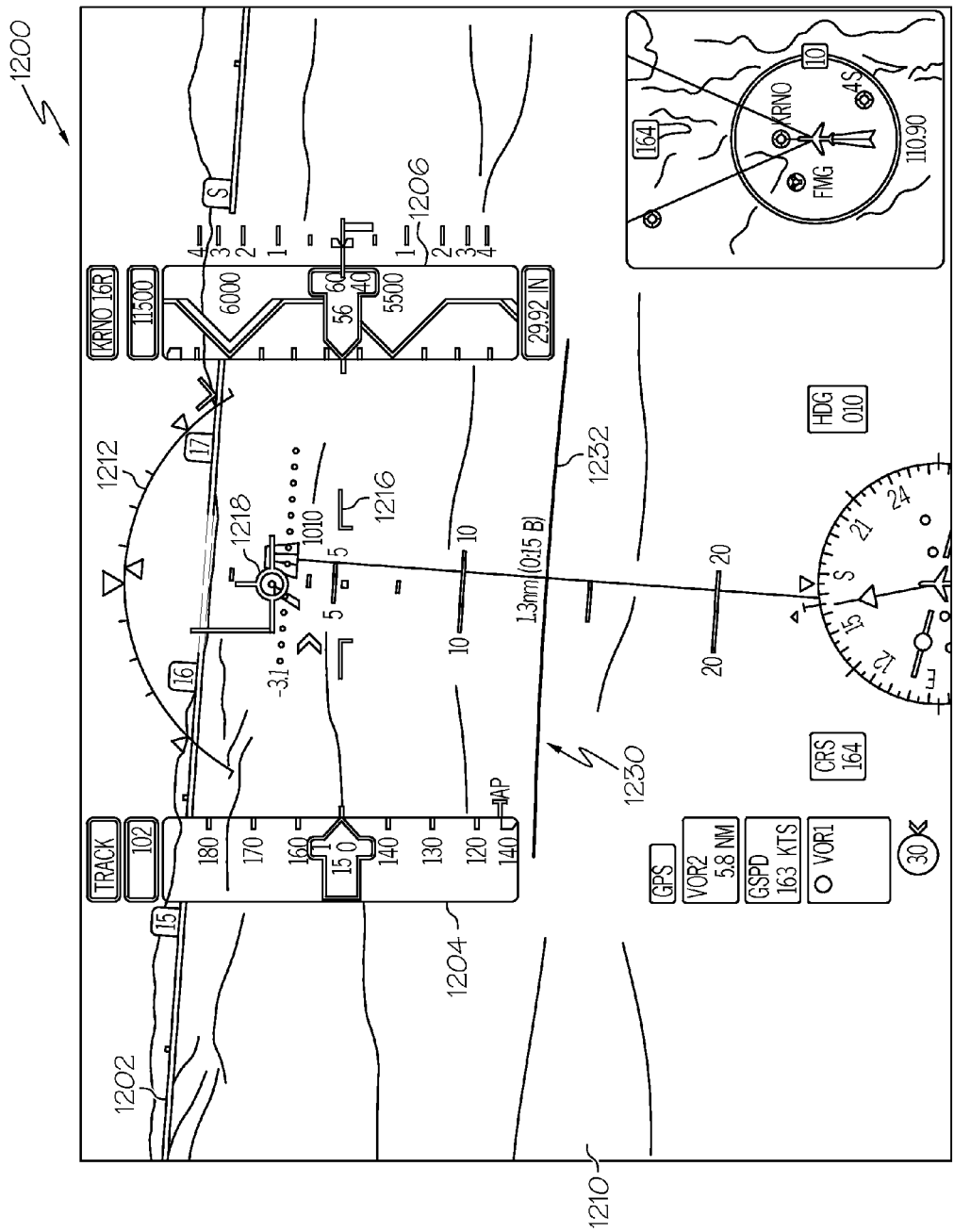
FIGS. 12-14 are visual displays for a primary flight display generated by the aircraft system of FIG. 2 in accordance with a further exemplary embodiment.
Figure 13:
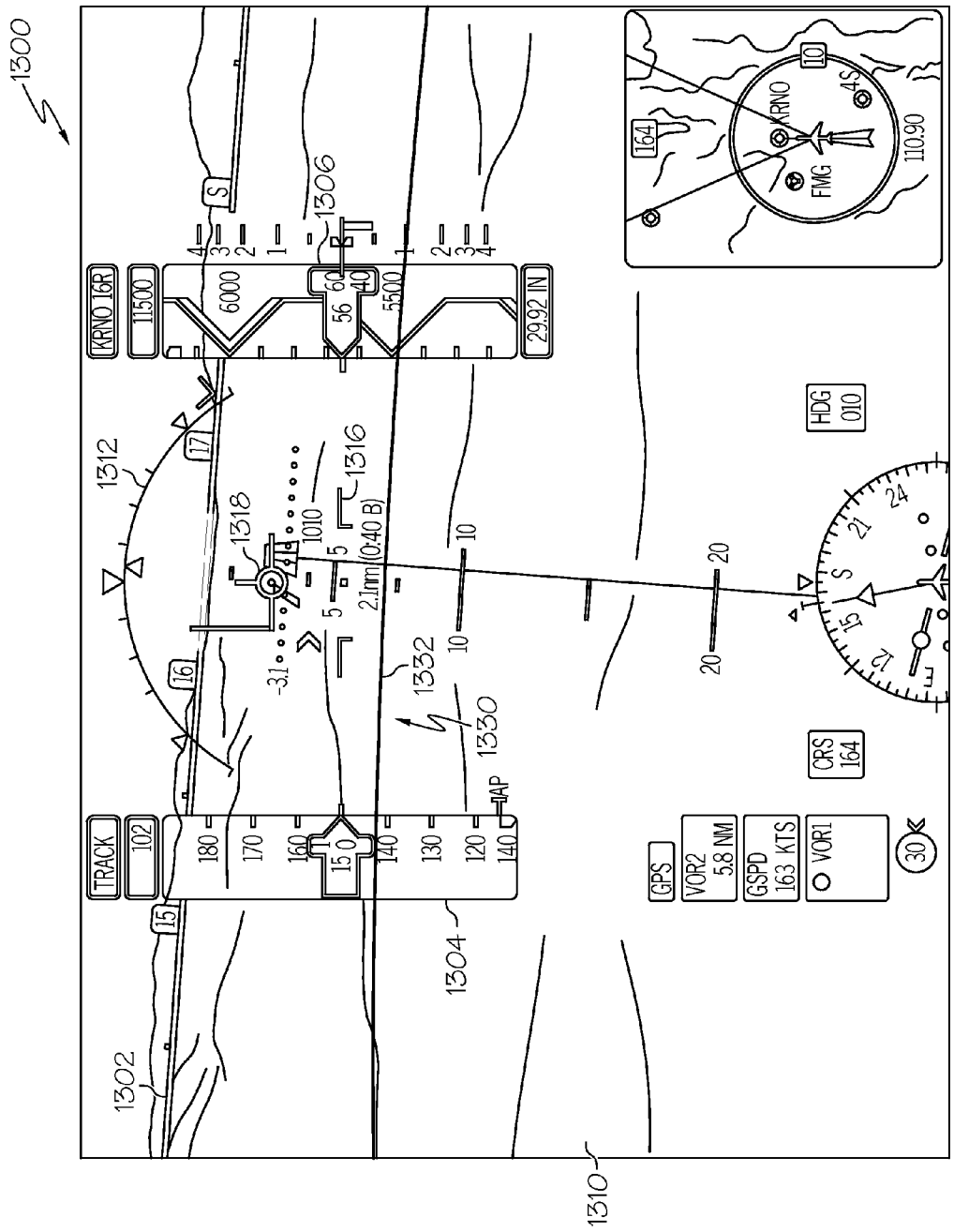
Figure 14:
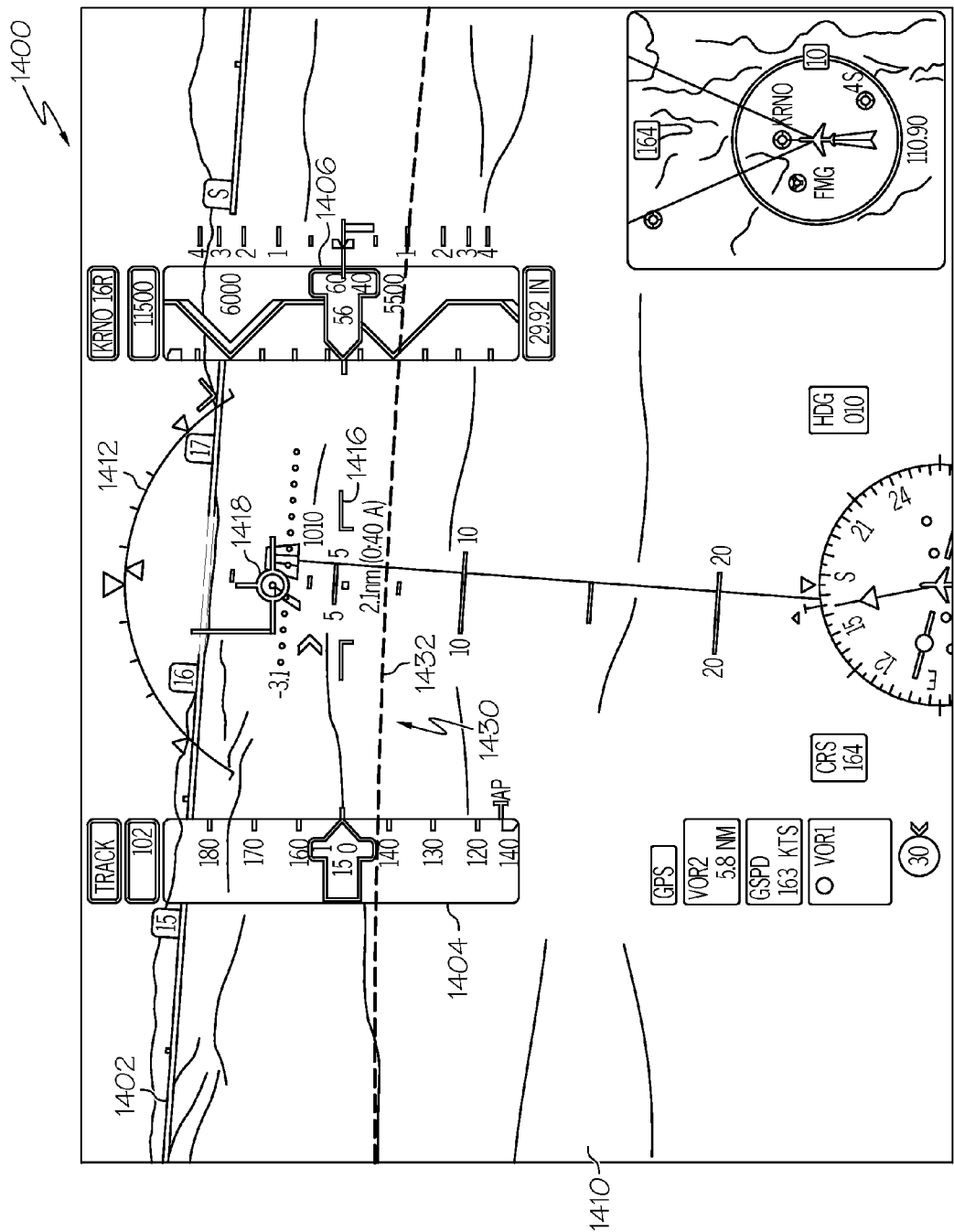

FIGS. 12-14 are visual displays for a primary flight display generated by the aircraft system of FIG. 2 in accordance with a further exemplary embodiment. Similar to the embodiments discussed above, FIGS. 12-14 provide symbology related to 4D deviation, In particular, the symbology in FIGS. 12-14 may be rendered in a 3D synthetic vision system (SVS), as described below.

The visual display 1200 of FIG. 12 is generally similar to the visual display 200 of FIG. 2 and shows, among other things, computer generated symbols representing a zero pitch reference line 1202, an airspeed scale or tape 1204, an altitude scale or tape 1206, and terrain 1210. Other symbology depicted in FIG. 12 includes a roll scale 1212, a pitch scale 1214, an aircraft reference 1216, and a flight path vector 1218. The visual display 1200 includes deviation symbology 1230 incorporated into or fused with the SVS view. In this embodiment, the deviation symbology 1230 may include a range ring (or arc) 1232 that moves relative to the terrain 1210. The range ring 1232 indicates the expected position of the aircraft relative to the flight plan as a matter of spatial perspective. Additionally, the range ring 1232 indicates the distance and time of the current state of the aircraft relative to the flight plan more specifically in text. For example, the range ring 1232 indicates that the aircraft is 1.3 nm short of the expected position and 15 minutes behind the time schedule. Other mechanisms for providing this information may be provided.

The visual display 1300 of FIG. 13 is generally similar to the visual display 1200 of FIG. 12 and shows, among other things, computer generated symbols representing a zero pitch reference line 1302, an airspeed scale or tape 1304, an altitude scale or tape 1306, terrain 1310, a roll scale 1312, a pitch scale 1314, an aircraft reference 1316, and a flight path vector 1318. The visual display 1300 includes deviation symbology 1330 incorporated into or fused with the SVS view. In this embodiment, the deviation symbology 1330 may include a range ring 1332 that moves relative to the terrain 1310. The range ring 1332 indicates the expected position of the aircraft relative to the flight plan as a matter of spatial perspective. Additionally, the range ring 1332 indicates the distance and time of the current state of the aircraft relative to the flight plan more specifically in text. For example, the range ring 1332 indicates that the aircraft is 2.1 nm short of the expected position and 40 minutes behind the time schedule. Other mechanisms for providing this information may be provided. The deviation symbology 1330 is an extended range ring 1332, which is in contrast to the relatively shorter range ring 1232 of the visual display 1200 of FIG. 12. The difference in length may provide an indication of the extent of deviation. For example, the extended range ring 1332 of FIG. 13 indicates a greater deviation than the shorter range ring 1232 of FIG. 12 (e.g., 40 minutes behind schedule as compared to 15 minutes).

The visual display 1400 of FIG. 14 is generally similar to the visual display 1300 of FIG. 13 and shows, among other things, computer generated symbols representing a zero pitch reference line 1402, an airspeed scale or tape 1404, an altitude scale or tape 1406, terrain 1410, a roll scale 1412, a pitch scale 1414, an aircraft reference 1416, and a flight path vector 1418. The visual display 1400 includes deviation symbology 1430 incorporated into or fused with the SVS view. In this embodiment, the deviation symbology 1430 may include a range ring 1432 that moves relative to the terrain 1410.

In this scenario, the current state of the aircraft is ahead of the flight plan. The deviation symbology 1430 may reflect this with a different appearance than the symbology 1230 and 1330 in the scenarios of FIGS. 12 and 13. For example, the range ring 1432 is dashed to indicate that the aircraft is ahead of schedule, as compared to the solid range rings 1232 and 1332 of FIGS. 12 and 13 that indicated that the current state of the aircraft was behind schedule.

The symbology 1430 may also provide an indication of the amount of deviation, for example, with text. In the scenario of FIG. 14, distance and time are superimposed on the range ring 1432. The distance reflects the current distance to the subsequent waypoint (e.g., 2.1 nm from the current position), and the time reflects the time of arrival according to the current state of the aircraft relative the flight plan. For example, in the scenario of FIG. 14, the current state of the aircraft suggests that the aircraft will arrive at the next waypoint 40 minutes ahead of schedule. Other mechanisms for providing this information may be provided.

As such, exemplary embodiments provide improved aircraft displays and display methods that have deviation symbology for lateral, vertical, and time deviation in a manner that is more intuitive and more easily grasped by a pilot, conveys more clearly a geometric picture related to the actual flight path and navigational limitations, and is within the pilot's primary scan area at all times while not interfering with unrelated information. Such symbology facilitates flight crew or operator situational awareness and vehicle control, which reduces pilot or operator workload and navigation errors, and thus results in increased aircraft and/or navigation safety. The deviation symbology may be used for both head-up displays and head-down displays in many different types of vehicles, such as automobiles and other land vehicles, water vehicles, simulated vehicles, etc.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft system comprising:
   a deviation module configured to
      receive a flight plan with a flight segment to a waypoint, the flight plan including a lateral profile, a vertical profile, and a time profile, the time profile including a predetermined time of arrival associated with the waypoint,
      receive a current lateral position and a current altitude,
      estimate an estimated time of arrival associated with the waypoint,
      compare the current lateral position to the lateral profile to generate lateral deviation,
      compare the current altitude to the vertical profile to generate vertical deviation, and
      compare the predetermined time of arrival to the estimated time of arrival to generate time deviation; and
   a visual display coupled to the deviation module and configured to display deviation symbology representing the lateral deviation, the vertical deviation, and the time deviation,
   wherein the deviation symbology includes
   a reference circle, and
   a first indicator circle that is sized relative to the reference circle to indicate time deviation.

2. The aircraft system of claim 1, wherein the reference circle and the first indicator circle are coincident when the time deviation is zero.

3. The aircraft system of claim 1, wherein the deviation symbology includes
   a vertical axis,
   a horizontal axis that intersects the vertical axis at a reference point,
   a second indicator positioned along the horizontal axis to represent lateral deviation based on a first distance from the reference point, and
   a third indicator positioned along the vertical axis to represent vertical deviation based on a second distance from the reference point.

4. The aircraft system of claim 1, wherein the deviation symbology includes
   a vertical axis,
   a horizontal axis that intersects the vertical axis at a reference point, and
   a second indicator positioned relative to the horizontal axis and the vertical axis to indicate lateral and vertical deviation.

5. The aircraft system of claim 4, wherein the reference circle and the first indicator circle are superimposed on the vertical axis and horizontal axis.

6. The aircraft system of claim 1, wherein the visual display is a primary flight display and the deviation symbology is stand-alone symbology.

7. The aircraft system of claim 1, wherein the visual display is a primary flight display configured to display a flight path vector, the deviation symbology being incorporated into the flight path vector.

8. The aircraft system of claim 1, wherein the visual display is a primary flight display configured to display a flight path director, the fused symbology being incorporated into the flight path director.

9. The aircraft system of claim 1, wherein the visual display is a primary flight display configured to display an airspeed scale, and wherein the deviation module is configured to generate a speed recommendation displayed at a position on the airspeed scale to arrive at the waypoint at the predetermined time.

10. The aircraft system of claim 1, wherein the visual display is a navigation display configured to display a lateral map, the deviation symbology being displayed on the lateral map, wherein the visual display is further configured to display a flight plan trajectory based on the flight plan and a time bug positioned on the flight plan trajectory representing the time deviation.

11. The aircraft system of claim 1, wherein the visual display is an instrumentation display configured to display a current throttle position and a time bug positioned relative to the throttle position to arrive at the waypoint at the predetermined time.

12. The aircraft system of claim 1, wherein the visual display is a synthetic vision system and the deviation symbology includes a range ring.

13. A method of displaying deviation symbology comprising the steps of:
    receiving a flight plan with a flight segment to a waypoint, the flight plan including a lateral profile, a vertical profile, and a time profile, the time profile including a predetermined time of arrival associated with the waypoint;
    receiving a current lateral position and a current altitude;
    estimating an estimated time of arrival associated with the waypoint,
    comparing the current lateral position to the lateral profile to generate lateral deviation;
    comparing the current altitude to the vertical profile to generate vertical deviation;
    comparing the predetermined time of arrival to the estimated time of arrival to generate time deviation; and
    displaying fused deviation symbology representing the lateral deviation, the vertical deviation, and the time deviation,
    wherein the displaying step includes displaying a reference circle and a first indicator circle that is sized relative to the reference circle to indicate time deviation.

14. The method of claim 13, wherein the displaying step includes displaying
    a vertical axis,
    a horizontal axis that intersects the vertical axis at a reference point,
    a second indicator positioned along the horizontal axis to represent lateral deviation based on a first distance from the reference point, and
    a third indicator positioned along the vertical axis to represent vertical deviation based on a second distance from the reference point.

15. The method of claim 13, wherein the displaying step includes displaying
- a vertical axis,
- a horizontal axis that intersects the vertical axis at a reference point, and
- a second indicator positioned relative to the horizontal axis and the vertical axis to indicate lateral and vertical deviation.

16. The method of claim 15, wherein the displaying step includes displaying the reference circle and the first indicator circle superimposed on the vertical axis and horizontal axis.

* * * * *